US008440022B2

(12) United States Patent
Wallin et al.

(10) Patent No.: US 8,440,022 B2
(45) Date of Patent: May 14, 2013

(54) METHOD FOR EXTRACTION OF SUGAR

(75) Inventors: Lars Göran Wallin, Laholm (SE); Jonas Wallin, Laholm (SE)

(73) Assignee: Sileco HB, Laholm (SE)

( * ) Notice: Subject to any disclaimer, the term of this patent is extended or adjusted under 35 U.S.C. 154(b) by 503 days.

(21) Appl. No.: 12/602,483

(22) PCT Filed: May 30, 2008

(86) PCT No.: PCT/SE2008/050636

§ 371 (c)(1), (2), (4) Date: Oct. 28, 2010

(87) PCT Pub. No.: WO2008/147328

PCT Pub. Date: Dec. 4, 2008

(65) Prior Publication Data

US 2011/0041838 A1 Feb. 24, 2011

(30) Foreign Application Priority Data

Jun. 1, 2007 (SE) ....................................... 0701375

(51) Int. Cl.
*C08B 30/04* (2006.01)

(52) U.S. Cl.
USPC ............................................................ 127/43

(58) Field of Classification Search ........................ None
See application file for complete search history.

(56) References Cited

FOREIGN PATENT DOCUMENTS

| | | | |
|---|---|---|---|
| RU | 2186113 | C1 | 7/2007 |
| SE | 31716 | C1 | 12/1909 |
| SU | 1696476 | A1 | 12/1991 |

OTHER PUBLICATIONS

International Search Report dated Sep. 2, 2008, issued in corresponding International Application No. PCT/SE2008/050636, filed May 30, 2008.

*Primary Examiner* — Melvin C Mayes
*Assistant Examiner* — Stefanie Cohen
(74) *Attorney, Agent, or Firm* — Christensen O'Connor Johnson Kindness PLLC

(57) ABSTRACT

A method for extraction of sugar from a sugar containing biomass is disclosed, wherein the sugar containing biomass a) is introduced in an extraction device (1), b) is treated with steam having a temperature of between 103 and 124° C., c) is treated in one or more steps with hot water having a temperature of 65-85° C., and d) is subjected to one or more compression steps, wherein a sugar containing solution is extracted from the sugar containing biomass in each of the steps c) and d) in the extraction device (1) and is removed from the extraction device (1), said method being continuously performed at an overpressure of 0.2-1.5 bar in the extraction device (1).

23 Claims, 1 Drawing Sheet

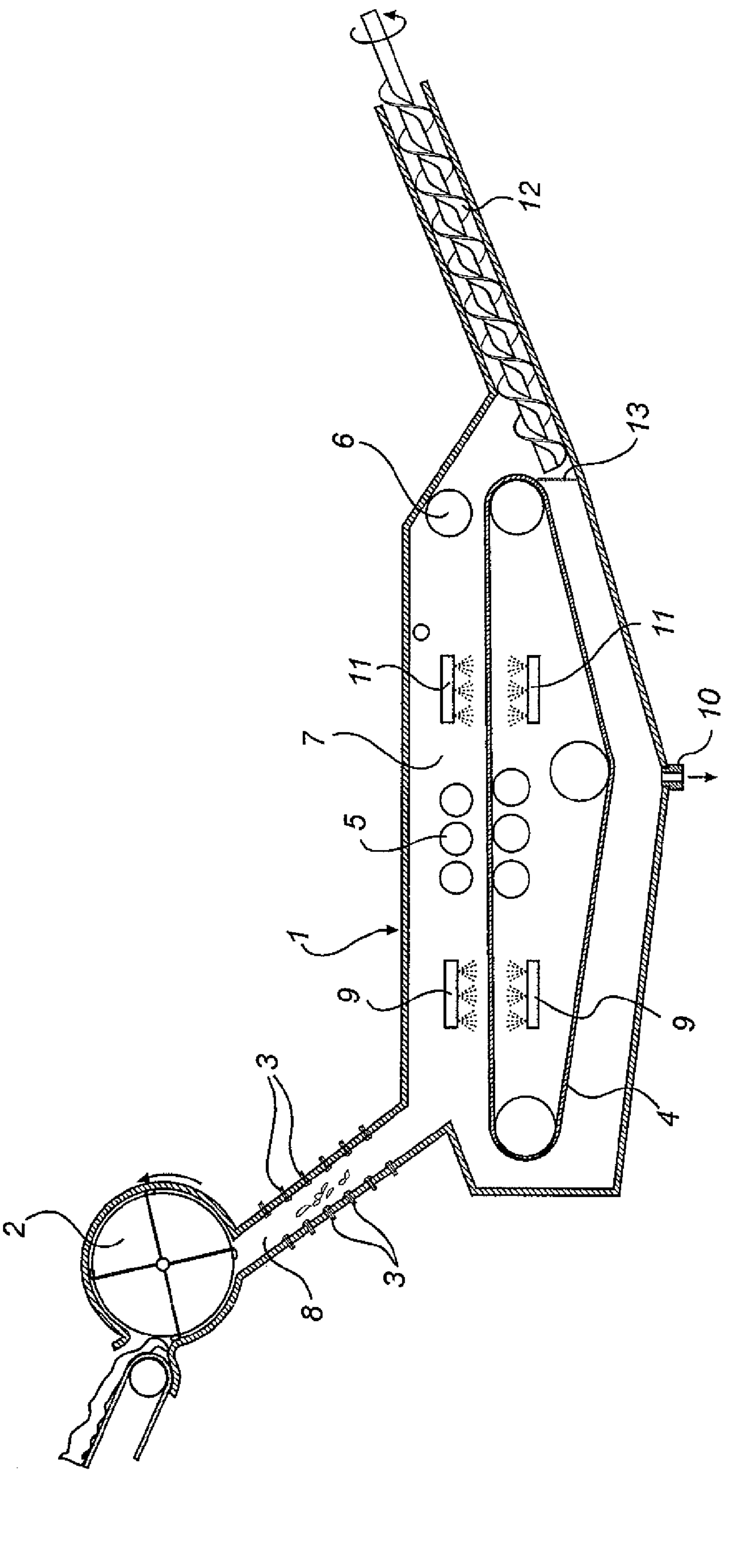
1
2
3
3
4
5
6
7
8
9
9
10
11
11
12
13

METHOD FOR EXTRACTION OF SUGAR

TECHNICAL FIELD OF THE INVENTION

The present invention relates to a method for extraction of sugar from a sugar containing biomass.

BACKGROUND ART

In conventional methods for extraction of sugar from sugar containing raw material, e.g. sugar-beets, in a sugar refinery plant, the raw material is first pre-treated by washing and elimination of stones, gravel, tops and other undesirable material and by cutting of said raw material into chips or cassettes, i.e. pieces having a shape and size similar to French fries. This is followed by boiling of the chips in large amounts of water with a view to releasing the sugar in the sugar-beets, and by compression with a view to extracting or leaching out as much sugar as possible from the sugar containing raw material.

In a conventional method for production of granulated and powdered sugar from sugar-beets, the sugar-beets are initially pre-treated as described above.

The sugar-beet chips are then fed to an extraction tower to which hot water is added, whereby sugar is extracted from the sugar-beet chips and is separated in a sugar containing solution.

The sugar-beet pulp from which sugar has been extracted is then compressed with a view to reducing the water content thereof. This compressed sugar-beet pulp may then be marketed as a dry fodder or may be dried together with molasses to a product called "betfor" (a Swedish term for dried beet with molasses), a more high-grade fodder product.

The sugar containing solution, i.e. the raw juice, extracted from the sugar-beet chips is purified by treatment with lime and $CO_2$. The precipitation obtained is then separated by filtration and may be used as a soil enhancing product. The purified raw juice, i.e. the "thin juice", is concentrated by evaporation several times to a "thick juice" which then is cooked in three boiling steps until it is so concentrated that all sugar becomes crystallised.

The sugar concentrate is added in the first boiling step to an intermediate container (maisch), in which further crystallization takes place, followed by a centrifugation step. After the centrifugation of the sugar containing solution from the first boiling step, the separated sugar is fed to a sugar dryer for production of granulated sugar. From the remaining sugar juice from the centrifugation step of the first boiling step, sugar is extracted in two further boiling steps, each involving crystallization and centrifugation. The extracted sugar obtained in the second and the third boiling step is then again added to the first boiling step for further purification. The rest product from the third boiling step, i.e. molasses, may be marketed as a fodder or is refined to "betfor".

Depending on the quality and type of sugar-beets, normally about 17-18% sugar can be extracted from sugar-beets, which normally have a sugar content of 15-20% by weight. The methods for extraction of sugar from other sugar containing raw material than sugar-beets follow the same principles as stated above. However, one common characteristic is that all such sugar extraction methods hitherto known are operated at underpressure during the boiling steps. Further, conventional methods for sugar extraction, e.g. for production of granulated sugar, are rather energy consuming, require addition of several additives, require a lot of process equipment and involve a risk of contamination with microbes or bacteria in the process system, thus jeopardizing the quality of the fodder by-products obtained.

Thus, there is a need for an improved method for extraction of sugar from sugar containing raw material, e.g. sugar-beets or other sugar containing crops, which reduces or eliminates the above-mentioned drawbacks, while still allowing at least the same or essentially the same degree of sugar extraction.

SUMMARY OF THE PRESENT INVENTION

The object of the present invention is to reduce or eliminate the above-mentioned problems experienced in connection with known techniques for extraction of sugar from a sugar containing biomass or raw material.

This object has been achieved with a method for extraction of sugar from a sugar containing biomass, wherein the sugar containing biomass a) is introduced in an extraction device (1),
b) is treated with steam having a temperature of between 103 and 124° C.,
c) is treated in one or more steps with hot water having a temperature of 65-85° C., and
d) is subjected to one or more compression steps, wherein a sugar containing solution is extracted from the sugar containing biomass in each of the steps c) and d) in the extraction device (1) and is removed from the extraction device (1), said method being continuously performed at an overpressure of 0.2-1.5 bar in the extraction device (1).

In one embodiment of said method, the steam treated sugar containing biomass fed to the central part (7) of the extraction device (1) is subjected to i) a first hot water treatment step, wherein hot water is sprayed on the sugar containing biomass through one or more hot water nozzles (9),
ii) an intermediate compression step, wherein the sugar containing biomass is brought to pass an intermediate compression device (5), preferably a belt press or a roller press containing one or more rolls,
iii) a second hot water treatment step, wherein hot water is sprayed on the sugar containing biomass through one or more hot water nozzles (11), and
iv) a hard compression step, wherein the sugar containing biomass is brought to pass a hard compression device (6), preferably a roller press or a belt press containing one or more rolls.

BRIEF DESCRIPTION OF THE DRAWINGS

FIG. 1 shows an extraction device according to one embodiment of the present invention.

DETAILED DESCRIPTION OF PREFERRED EMBODIMENTS

The present invention will be described below with reference to FIG. 1 showing one embodiment of the present invention.

In the method according to the present invention the sugar containing biomass or raw material is introduced in an extraction device 1 in which the extraction of the sugar is to take place.

The terms "sugar containing biomass" and "sugar containing raw material" used throughout the present application are intended to mean any form, e.g. cut or decomposed to chips, cossettes, slices or other forms, of a natural product or crop from which sugar can be extracted and is of interest to extract, e.g. root vegetables, fruits, pot-herbs, or other sugar containing crops of any origin in the world. Particular examples of sugar containing raw materials are sugar-beets (*Beta vulgaris*), sugar canes, beetroots, fodder beets, bananas, and pineapples. The sugar containing biomass may also be a mixture of two or more of these sugar containing crops prepared in any form, and may also be included in a medium containing other ingredients, e.g. additives for dissolution or homogenisation of the original crop.

The term "sugar" used throughout the present application is intended to mean essentially the carbohydrate sucrose, which is useful as additive in e.g. food, but also includes other carbohydrates, such as glucose, and fructose, as well as mixtures thereof, useful for different applications. The term "cane sugar" is also intended to fall within the definition of the word "sugar".

The sugar containing biomass introduced in the extraction device 1 may first be pre-treated in a conventional way, as initially described. As to sugar-beets, they are initially evaluated and tested as to quality, added to open containers filled with water ("svämmor") in order to dissolve soil, tops are eliminated, and washing steps are normally performed, optionally also homogenisation and dissolution steps. With a view to facilitating the sugar extraction, the sugar-beets are normally cut into pieces, preferably chips or cossettes, having a size and a shape similar to that of food chips or French fries.

The sugar containing biomass, such as sugar-beets, is added to the extraction device 1 in a conventional way. In one embodiment chips of sugar-beets are fed to an inlet of the extraction device 1, e.g. on a conventional conveyor belt. As the interior of the extraction device 1 has to be maintained at overpressure throughout the sugar extraction method according to the present invention, the inlet of the extraction device 1 is provided with an inlet sluice valve device 2, which allows the feeding of the sugar containing biomass into the extraction device 1 while maintaining the overpressure in the extraction device 1. The inlet sluice valve device 2 may be any conventional sluice valve device having the above-mentioned feeding and sealing function. In one embodiment, which is shown in FIG. 1, the inlet sluice valve device 2 comprises a cylindrical drum acting according to a principle similar to rotating entrances to e.g. stores and hotels. Said drum contains four centrally and symmetrically arranged wings rotating counter-clockwise and defining four equally sized compartments, each feeding said chips in such a way that there is never any air contact between the interior of the extraction device 1 and the outside atmosphere. The drum is sealed with a sealing shoe in the end of each wing in the clearance space between each wing end and the surface of the inner wall of the drum, as shown in FIG. 1. Thus, the inlet sluice valve device 2 allows continuous feeding of the sugar containing biomass to the extraction device 1 while still maintaining the overpressure in the extraction device 1. In other embodiments said drum may be provided with more than four compartments, alternatively with three compartments, as long as the sealing function is provided.

When the sugar containing biomass has been introduced in the extraction device 1 through the inlet sluice valve device 2, it is subjected to treatment with steam having a temperature of 103-124° C., preferably 109-120° C., wherein the cell walls of the sugar containing biomass collapses due to this chock heating. Due to the cell wall collapse, the sugar molecules within the cells become available. The chips of the sugar containing biomass normally contain in the case of sugar-beets 75-78% by weight of water, 17-18% by weight of sugar, and about 5% by weight of fibres, proteins, etc. The water steam is introduced into the extraction device 1 through one or more steam nozzles 3. Said chips may be treated with the steam when they are fed on a web 8 collecting the chips introduced into the extraction device 1. Said web 8 may be arranged in connection with the inlet part of the extraction device 1 in such a way that the chips are falling or sliding down onto the start end of said web 8. In the embodiment shown in FIG. 1, the web 8 extends in a channel in which the steam treatment is performed and which leads to a central part 7 of the extraction device 1. The web 8 and the channel surrounding the web are inclined downwardly from the inlet sluice valve device 2 to the central part of the extraction device 1, and the chips are transported downwardly on the web 8 during the steam treatment towards the central part 7 of the extraction device 1. Said channel is connected to the inlet sluice valve device 2 of the extraction device 1 in a sealing fashion and thus constitutes a part of the extraction device 1. The web 8 may be any kind of substrate on which said chips may be fed or slide, e.g. a conveyor belt or a slide surface. In the embodiment in FIG. 1 the web 8 is a slide surface made of stainless steel. If the web 8 is a conveyor belt, it can be horizontally arranged or with a slight inclination. In case the web 8 is a slide surface, the inclination of the web 8 may not be so high that the chips are falling down on the subsequent transport device 4, and not so low that the process time becomes too long and energy consuming. The chips are sliding or fed on the web 8 in the form of a bed of chips of the sugar containing biomass. With a view to maintaining a satisfactory heat penetration through the bed of chips, the thickness of said bed should not exceed 100 mm. The steam nozzles 3 may be conventional steam nozzles in any suitable arrangement close to the web 8 and may have different sizes, forms, and steam spreading angles depending on the positions thereof and the spraying pressure desired. The steam nozzles 3 may e.g. be mounted on transversely arranged ramps in the channel surrounding the web, more precisely inside the channel above the web 8 with the bed of chips, as well as within and/or under the web 8 supporting the bed of chips, wherein said web 8 being liquid permeable. In the case the web 8 is a slide surface, the steam nozzles 3 may be arranged in openings in the slide surface in such a way that the bed of chips is sprayed with steam on its under side. The steam treatment is thereby optimized, as both the top and bottom surface of said bed may be sprayed. In the steam treatment step a sugar containing solution is extracted to a small extent from the bed of sugar containing biomass and is flowing downwardly along the web 8 towards the bottom of the central part 7 of the extraction device 1 for removal out therefrom.

The overpressure in the extraction device 1 is obtained due to the steam introduced through the steam nozzles 3, optionally supported with compressed air through nozzles therefor, if needed. The overpressure in the extraction device 1 is 0.2-1.5 bar, preferably 0.4-1.2 bar, compared to the surrounding atmospheric pressure, i.e. an absolute pressure of 1.2-2.5 bar, preferably 1.4-2.2 bar. These overpressure ranges correspond to the steam temperature ranges of 103-124° C., and 109-120° C., respectively. The number of steam nozzles 3, the positioning thereof in relation to the web 8 (i.e. the arrangement close to the web 8) supporting or feeding the bed of chips, and the amount of steam sprayed on the bed of chips through said steam nozzles 3, are not critical as long as a satisfactory degree of collapse of the cell walls of the sugar containing biomass is obtained and the overpressure required is attained and maintained. However, in the embodiment shown in FIG. 1 five steam nozzles 3 are arranged above the web 8 and five under the web 8.

The overpressure in the extraction device may be monitored by one or more sensors during the sugar extraction method, and if the overpressure would reach a maximum of 1.5 bar during a normal operation according to the invention, the sensor/sensors instruct/s one or more pressure regulation valves to regulate the pressure. Any conventional pressure sensoring and regulating equipment may be used and may be located anywhere in the sugar extraction device. Alternatively, a simple mechanical pressure regulating valve may be used, as well as a valve device having both the pressure sensoring and regulating functions.

In the central part 7 of the extraction device 1 the chips of sugar containing biomass, which has been subjected to steam treatment thereby inducing cell collapse, are then subjected to a first hot water treatment step.

At the outlet of the channel surrounding the web 8 and at the inlet of the central part 7 of the extraction device 1 the chips of steam treated sugar containing biomass in the embodiment shown in FIG. 1 slide down to a transport device 4 in the form of an endless conveyor belt, which is liquid permeable. The hot water is added to the bed of steam treated sugar containing biomass through hot water nozzles 9 arranged close to the conveyor belt 4, in this embodiment under and over the liquid permeable conveyor belt 4. The temperature of the hot water is 65-85° C., preferably 82-85° C. The higher the feed rate of the conveyor belt 4, the higher the hot water temperature may be. The added hot water releases sugar and water molecules from the steam treated sugar containing biomass with collapsed cell walls. The sugar containing solution extracted from the sugar containing biomass due to the hot water treatment and flowing downwardly in the extraction device 1 may be collected inside or outside the extraction device 1 and in such a way that the overpressure in the extraction device 1 still is maintained, e.g. via a sealing outlet valve port 10 located in the bottom of the extraction device 1. The outlet valve port 10 may be any conventional device for the purpose stated above. The amount of water sprayed on the bed of chips of the sugar containing biomass is not critical, but must be enough to release sugar from the steam treated sugar containing biomass.

In the embodiment shown in FIG. 1, the bed of sugar containing biomass, which has been subjected to treatment with hot water, may be further fed on the conveyor belt 4 to an intermediate compression device 5, e.g. a belt press or a roller press each containing one or more rolls, whereby the bed of steam and hot water treated sugar containing biomass is slightly compressed with a view to extracting more sugar. The intermediate compression should not be so high that the structure of the sugar containing biomass is destroyed, which otherwise would reduce the quality of the pulp by-product obtained in the end of the method and intended for use as a fodder product. The intermediate compression device 5 contains at least two rolls arranged above the bed of sugar containing biomass on the transport device 4 and at least two rolls under the transport device 4. In the embodiment shown in FIG. 1 three rolls are arranged over and three rolls arranged under the conveyor belt 4, respectively. The sugar containing solution extracted from the intermediate compression step and flowing downwardly in the extraction device 1, may be collected in the same way as the sugar containing solution in the preceding first hot water treatment step.

Thereafter, the compressed bed of sugar containing biomass is subjected to a further treatment with hot water with hot water nozzles 11 in a second hot water treatment step, e.g. under the same conditions as in the above-mentioned first hot water treatment step. The nozzles 9 and 11 used in the two hot water treatment steps, respectively, may be any conventional nozzles of the same or different types. The number of nozzles, the positioning thereof (i.e. the arrangement close to the transport device 4) and the amount of hot water added, are not critical as long as satisfactory extraction of sugar during the hot water treatment steps is obtained. In the embodiment shown in FIG. 1 three nozzles 9 and 11 are arranged over, and three nozzles 9 and 11 under the conveyor belt 4 during the two hot water treatment steps. In the second hot water treatment step, further sugar is released from the bed of sugar containing biomass and is flowing as a sugar containing solution downwardly from the conveyor belt 4 towards the bottom of the extraction device 1 and may also be collected in the same way as the sugar containing solution from the first hot water treatment step and the intermediate compression step.

Then the bed of sugar containing biomass, which has been subjected to a first and a second hot water treatment step and an intermediate compression step, is subjected to a hard compression step by the use of a compression device 6, e.g. a roller press or a belt press containing one or more rolls with a view to extracting further sugar from the bed of sugar containing biomass. The compression force in the hard compression step is higher compared to the compression force in the intermediate compression step. The sugar containing solution obtained from this hard compression step, which is flowing downwardly from the compression device 6 towards the bottom of the extraction device 1, is also collected from the extraction device 1, e.g. in the same way as for the sugar containing solution from the first and the second hot water treatment step and the intermediate compression step, respectively. In the embodiment shown in FIG. 1, the compression device 6 is located in the end of the conveyor belt 4. During the hard compression step, the roller pressure should be high enough to extract as much sugar as possible, however, not so high that the overall structure of the chips is destroyed, which otherwise would adversely influence the subsequent fodder production based on the pulp by-product.

Then the sugar containing biomass, from which sugar has been extracted in the preceding steps, is subjected to a final compression step by the use of a final compression device 12, such as a continuous screw press, e.g. a so-called hydropress. This step is conventional and extracts the final part of sugar from the sugar containing biomass. Further, the final compression device 12 also acts as a pressure guard in the outlet end of the extraction device 1, thereby maintaining the overpressure therein. The sugar containing solution extracted from the screw press 12, as appears from the embodiment shown in FIG. 1, and flowing downwardly from the screw press 12 towards the bottom of the extraction device 1, is collected from the extraction device 1, e.g. in the same way as for the sugar containing solution from the first and the second hot water treatment step, respectively, and the preceding intermediate and hard compression step, respectively. In one embodiment, the sugar containing solutions from the two different hot water treatment steps and the three different compression steps disclosed above, as well as the small amount of sugar containing solution extracted in the initial steam treatment step, are collected in the bottom of the extraction device 1, and is then pumped out from the outlet valve port 10 of the sugar extraction device 1 to an exterior storage tank for further treatment. The sugar containing solutions collected in the bottom of the central part 7 of the extraction device 1 may be removed from the extraction device 1 in a controlled way, e.g. by the use of a liquid level regulator sensoring the volume collected. When a predetermined level of sugar containing solution is detected, sugar containing solution is removed from the extraction device 1 through the outlet valve port 10. The final compression step performed with the screw press 12 should be performed cautiously compared to the preceding hard compression step with a view to not destroying the overall structure of the chips, which otherwise would reduce the quality of the fodder by-product discussed above. The sugar containing solution collected from the extraction device 1 during the sugar extraction process may be used for e.g. ethanol production. The remaining sugar containing pulp by-product from the final compression step, which has been released from as much sugar as possible, is fed out from the outlet end of the screw press 12 in the extraction device 1 and may be used as animal fodder.

Further, as shown in FIG. 1 in the extraction device 1, a filter device 13, e.g. a strainer plate, may be located between the screw press 12 and the bottom of the extraction device 1 with a view to eliminating and scavenging any particles or other undesirable material from the sugar containing solution from the final compression step, optionally also from the hard compression step, when it flows downwardly towards the bottom of the extraction device 1.

The dimensions of the extraction device 1 and the devices belonging thereto and included therein are not critical and may be adapted in accordance with the process conditions desired. In the embodiment shown in FIG. 1, the hot water treatment steps and the intermediate and hard compression steps, respectively, are performed in the central part 7 of the extraction device 1, while the steam treatment step is performed in the inlet part of the extraction device 1, and the final compression step is performed in the outlet part of the extraction device 1. The steam nozzles 3 and the hot water nozzles 3, 9 and 11, respectively, the compression devices 5, 6, and 12, the transport device 4, the outlet valve port 10, the web 8 and the filter device 13 may be any conventionally used devices, but are herein arranged in a specific mode for carrying out the method according to the present invention.

It could also be added that the second hot water treatment step may be followed by one or more further hot water treatment steps, optionally also by one or more further compression steps in addition to those disclosed above The concentration of sugar in the sugar containing solution obtained from the method depends on the original sugar content of the original sugar containing raw material or biomass and may vary in view of the type of sugar containing raw material or biomass and also from year to year. For sugar-beets, normally having a sugar content of 16-18% by weight, a sugar containing solution having a sugar content of 14-15% may be obtained, e.g. 14.5%.

The total process feed rate from the input to the inlet sluice valve device 2 to the outlet of the final compression device 12 in the extraction device 1, is 20-60 tons of sugar containing biomass per hour, preferably 35-40 tons per hour. The total process time for the inventive method is normally 1-10 min, preferably 3-6 min. The speed of the transport device 4 is not critical and depends on the type of biomass to feed and the feed rate used.

The advantage of the present invention compared to prior art is that the same amount of sugar may be extracted from the sugar containing biomass, but at a reduced energy consumption (up to 70% reduction). Another advantage is that the process may be performed completely continuously at overpressure due to the inlet sluice valve device 2. Further, equipment such as specific boiling tanks and subsequent separation devices, as well as certain additives, e.g. lime, are not required in the process according to the present invention. The conveyor belt used as a transport device 4 also acts a process surface making the sugar containing biomass more available for treatment compared to known techniques.

Another advantage of the inventive process is that the total process time is reduced, as the release of sugar from the sugar containing total biomass is much quicker than in prior art techniques. The heat treatment at overpressure also kills any contaminating microbes or sporulating bacteria in the process system, thereby increasing the hygienic safety for the beet pulp by-product intended for use as a fodder. Further, the amount of water added to the sugar extraction process may be largely reduced with more than 50% compared to prior art, as the present inventor has taken advantage of the high water content in the sugar containing raw material as such.

Example

With reference to FIG. 1, an example of a method according to the present invention will be described.

Experiments have been performed in an extraction device essentially constructed as the extraction device 1 in FIG. 1. 30 tons per hour of sugar-beets cut into chips is introduced in the extraction device having an overpressure of 0.8 bar. When sliding downwardly on the slide surface the chips are subjected to steam having a temperature of 116° C. The steam treated chips are then fed on an endless conveyor belt and is subjected to a first hot water treatment with water having a temperature of 75° C. This is followed by an intermediate compression step with a belt press, having three rolls above the conveyor belt and three rolls under the conveyor belt, a second hot water treatment with water having a temperature of 75° C., a hard pressure step with a roller press, and a final compression step with a continuous screw press. Sugar containing solutions obtained during the different steps performed above are collected and removed from the extraction device. The sugar content of the sugar containing solution pooled and removed from the extraction device is 1-1.5% lower than the original sugar content of the sugar-beet fed into the extraction device. This is in line with the sugar content obtainable in conventional sugar extraction. However, the process time was more than 50% shorter than the process time in the prior art technique for the same feed rate of sugar-beet chips. Further, the energy consumption during the extraction process according to the present invention was about 70% lower than the energy consumption in the prior art technique.

About 50 experiments have been performed with slight variations of the overpressure, temperature and time parameters, however, within the ranges defined in claim 1, and the results defined above have been obtained in each experiment.

The invention claimed is:

1. A method for extraction of sugar from a sugar containing biomass, wherein the sugar containing biomass a) is introduced in an extraction device, b) is treated with steam having a temperature of between 103 and 124° C., c) is treated in one or more steps with hot water having a temperature of 65-85° C., and d) is subjected to one or more compression steps, wherein a sugar containing solution is extracted from the sugar containing biomass in each of the steps c) and d) in the extraction device and is removed from the extraction device, said method being continuously performed at an overpressure of 0.2-1.5 bar in the extraction device.

2. The method according to claim 1, wherein said overpressure is 0.4-1.2 bar.

3. The method according to claim 1, wherein said steam has a temperature of between 109 and 120° C.

4. The method according to claim 1, wherein said sugar containing biomass is introduced in the extraction device via an inlet sluice valve device, comprising a drum having wings defining four compartments, and having a sealing action between the interior of the extraction device and the outside atmosphere.

5. The method according to claim 1, wherein the sugar containing biomass during the steam treatment is fed on a web downwardly inclined from the inlet sluice valve device (2) towards the extraction device, wherein said web comprises a slide surface or a conveyor belt.

6. The method according to claim 5, wherein said sugar containing biomass is treated with steam introduced in the extraction device through one or more steam nozzles arranged close to the web.

7. The method according to claim 6, wherein the steam nozzles are arranged above and under said web and spray the steam on the sugar containing biomass fed on said web, and wherein said web is liquid permeable.

8. The method according to claim 5, wherein the sugar containing biomass is fed on a web downwardly inclined from the inlet sluice valve device towards a central part of the extraction device.

9. The method according to claim 2, wherein the steam treated sugar containing biomass fed to the extraction device is subjected to i) a first hot water treatment step, wherein hot water is sprayed on the sugar containing biomass through one or more hot water nozzles, ii) an intermediate compression step, wherein the sugar containing biomass is brought to pass an intermediate compression device, comprising a belt press or a roller press containing one or more rolls, iii) a second hot water treatment step, wherein hot water is sprayed on the sugar containing biomass through one or more hot water nozzles, and iv) a hard compression step, wherein the sugar containing biomass is brought to pass a hard compression device, comprising a roller press or a belt press containing one or more rolls, wherein the sugar containing biomass in the steps i)-iv) above is fed on a transport device, and wherein a sugar containing solution is extracted from the sugar containing biomass in each of the steps i)-iv).

10. The method according to claim 9, wherein each sugar containing solution is collected in the bottom of the extraction device and are removed from the extraction device (1) via an outlet valve port (10).

11. The method according to claim 9, wherein said one or more hot water nozzles, are arranged above and under the transport device feeding the sugar containing biomass, and wherein said transport device is liquid permeable.

12. The method according to claim 9, wherein the sugar containing biomass is subjected to a final compression step, wherein the sugar containing biomass is brought to pass a final compression device, which also acts as an outlet sealing device in the outlet end of the extraction device, wherein a sugar containing solution is extracted from the sugar containing biomass in the final compression step and is collected in the bottom of the extraction device, and wherein a sugar containing pulp with a reduced sugar content is obtained as a by-product and is removed through the outlet end of the final compression device in the extraction device.

13. The method according to claim 12, wherein a sugar containing pulp with a reduced sugar content comprises molasses.

14. The method according to claim 1, wherein the sugar containing biomass is subjected to a final compression step, wherein the sugar containing biomass is brought to pass a final compression device, which also acts as an outlet sealing device in the outlet end of the extraction device, wherein a sugar containing solution is extracted from the sugar containing biomass in the final compression step and is collected in the bottom of the extraction device, and wherein a sugar containing pulp with a reduced sugar content, preferably molasses, is obtained as a by-product and is removed through the outlet end of the final compression device in the extraction device.

15. The method according to claim 14, wherein the sugar containing solution extracted from the final compression step is brought to pass a filter device, comprising a strainer, before it is collected in the bottom of the extraction device.

16. The method according to claim 1, wherein the sugar containing biomass is sugar-beets, sugar canes, beetroots, fodder beets, bananas, or pineapples, or a mixture of two or more thereof.

17. The method according to claim 1, wherein the sugar in the sugar containing solution extracted from the sugar containing biomass and removed from the extraction device is sucrose, glucose or fructose, or a mixture of two or more thereof.

18. The method according to claim 1, wherein the sugar containing biomass is fed into the extraction device in the form of chips, cossettes or slices.

19. The method according to claim 1, wherein the overpressure in the extraction device throughout the process is controlled and regulated with one or more pressure sensors and one or more pressure regulation valves, or with a valve device having both the pressure sensoring and regulating functions.

20. The method according to claim 1, wherein the process time is 1-10 min.

21. The method according to claim 20, wherein the process time is 3-6 minutes.

22. The method according to claim 1, wherein the feed rate in the process is 20-60 tons of sugar containing biomass per hour.

23. The method according to claim 22, wherein the feed rate in the process is 35-40 tons of sugar containing biomass per hour.

* * * * *